Oct. 5, 1943.   J. B. COKER ET AL   2,330,799
SCORE PROJECTING APPARATUS
Filed July 8, 1940   3 Sheets-Sheet 1

Inventors:
JOHN B. COKER and
HAROLD G. FITZ GERALD
By Raymond Ives Blakeslee
Attorney

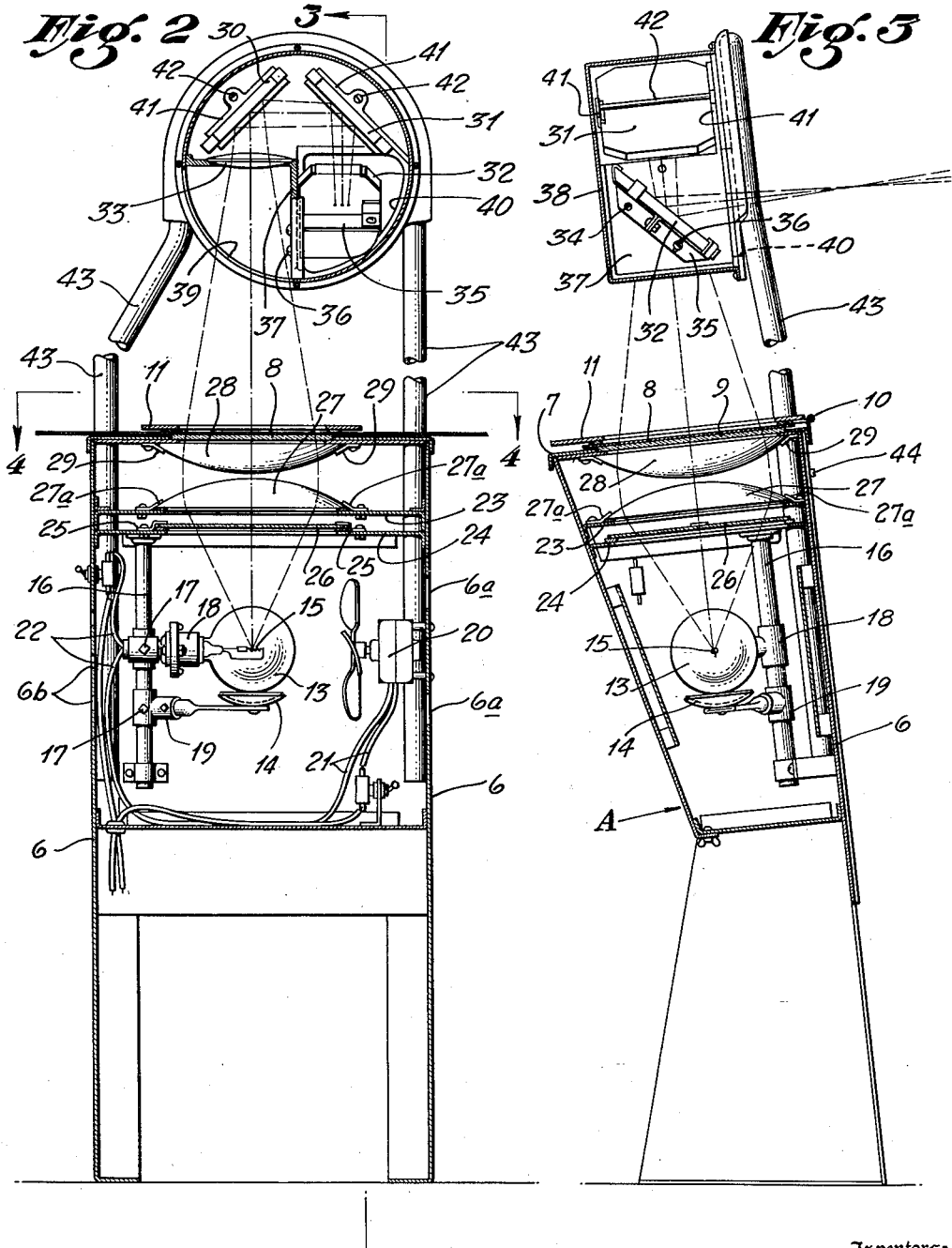

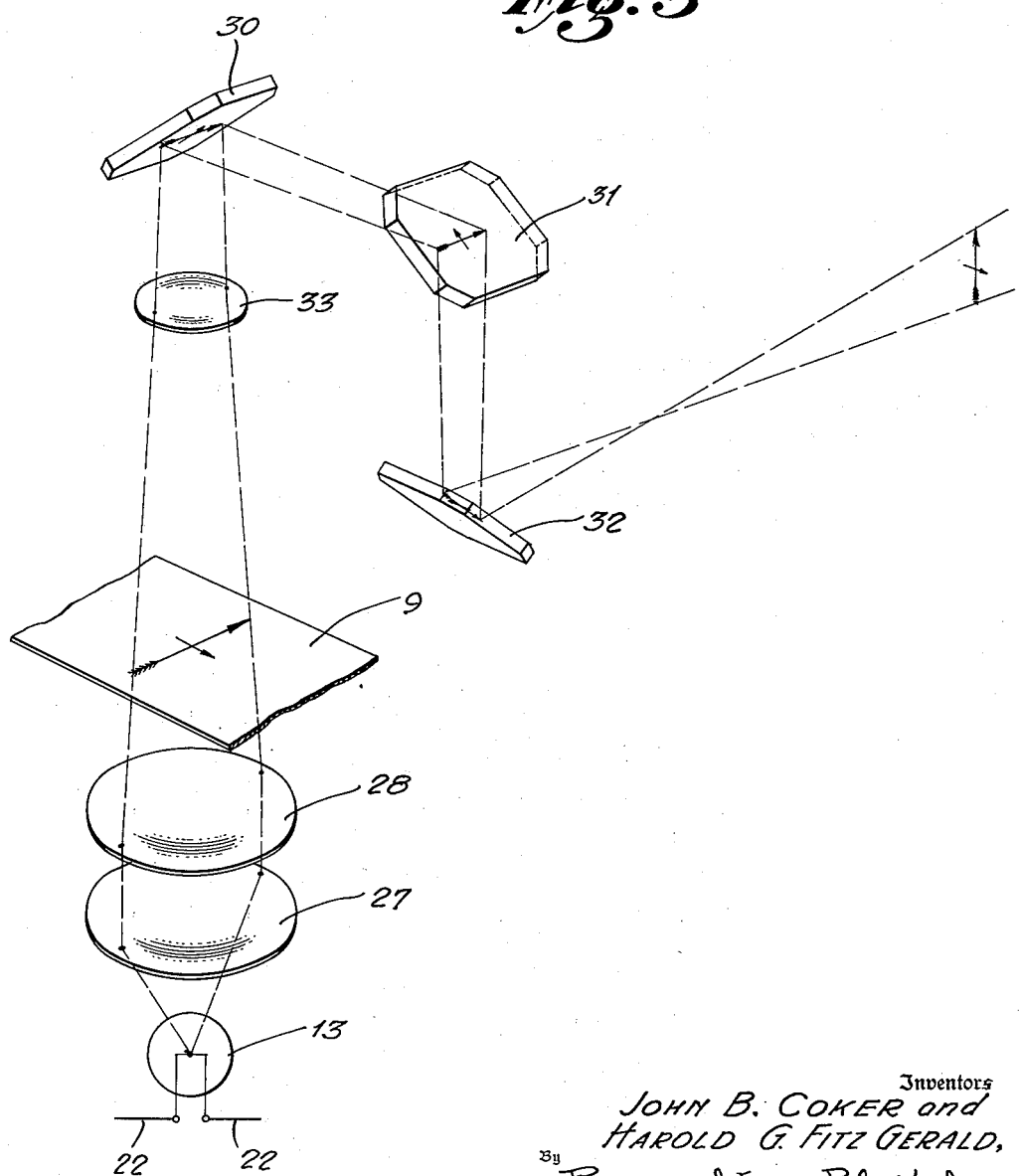

Patented Oct. 5, 1943

2,330,799

UNITED STATES PATENT OFFICE 2,330,799

SCORE PROJECTING APPARATUS

John B. Coker, San Diego, and Harold G. Fitz Gerald, Los Angeles, Calif.; said Fitz Gerald assignor to said Coker Application July 8, 1940, Serial No. 344,312

6 Claims. (Cl. 88—24)

This invention relates to score projecting apparatus, and more particularly to apparatus whereby a score or scores may be recorded as the event or events concerned transpires or transpire, and the recorded matter then projected by application of light to a score-board so that the contestants or the spectators, or both, may observe the score as the contest proceeds.

In accordance with the invention, the score-keeper notes the contest as it proceeds and continuously or intermittently records the items of score, and these, when projected to a suitable screen or other surface, keep the persons present currently informed as to the progress of the contest. Preferably, the invention is carried into effect by recording the score upon a transparent sheet having distinguishing words, letters or characters or spaces or columns, or the like, with spaces for the names of contestants or entries, so that the recording of the scores is reduced to a matter of brief or condensed writing, all in an orderly arrangement. A suitable source of light is positioned adjacent such recorded score and thence is passed through the transparent portions of the same, producing a score image which is then directed, preferably by lenses or mirrors or both, to a suitable screen or surface at a suitably located point; and in accordance with the invention a particular interrelation of these image-directing instrumentalities results in the displaying of the score upon such screen or surface in such order that it is properly legible by those viewing same, just as if the same were directly written or imprinted or recorded upon such screen or surface.

In a preferred form, the writer of the record faces the screen or other surface, and, as he writes, the record or score is progressively transmitted to and displayed upon said screen or surface and in the same order in which he writes it upon the score sheet.

The invention has for an object to provide improved apparatus of the character referred to and hereinafter disclosed and exemplified in one form only in the drawings, which would be generally superior in point of efficiency, inexpensiveness and simplicity of construction and make-up taken in conjunction with accuracy of recordation and distinctness of display, and which will be generally superior in serviceability.

With the above and other objects, which will duly appear, the invention consists in the novel and useful provision, formation, construction, combination, association and interrelation of parts, members and features, all as hereinafter described, shown in the drawings in one form only, and finally pointed out in claims.

The present application constitutes a partly continuing application with respect to application filed by us jointly for Score projecting apparatus, on May 28, 1938, Serial Number 210,676.

In the drawings:

Fig. 2 is a vertical, transverse, sectional view, with parts in full lines, of the apparatus, upon an enlarged scale, partly broken away;

Fig. 3 is a vertical, enlarged, front-to-rear sectional elevation of the apparatus, parts being in elevation and broken away;

Fig. 5 is a schematic drawing illustrating the factors of refraction and reflection involved in the action of the apparatus.

Corresponding parts in all the figures are indicated by the same reference characters.

Figure 1:
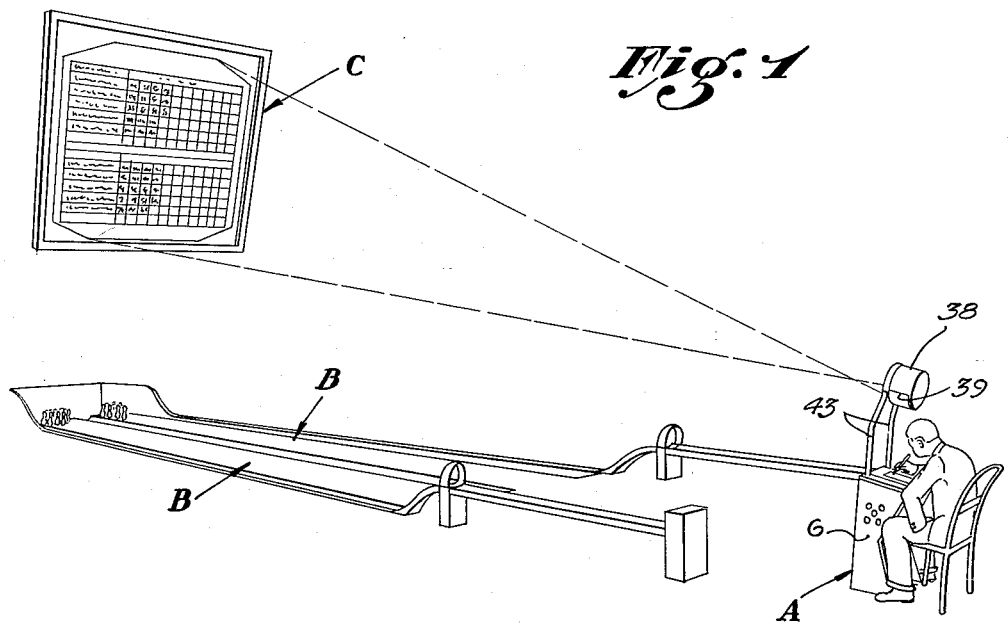
Fig. 1 is a perspective, illustrative view of an embodiment and practice of the invention.
Figure 4:
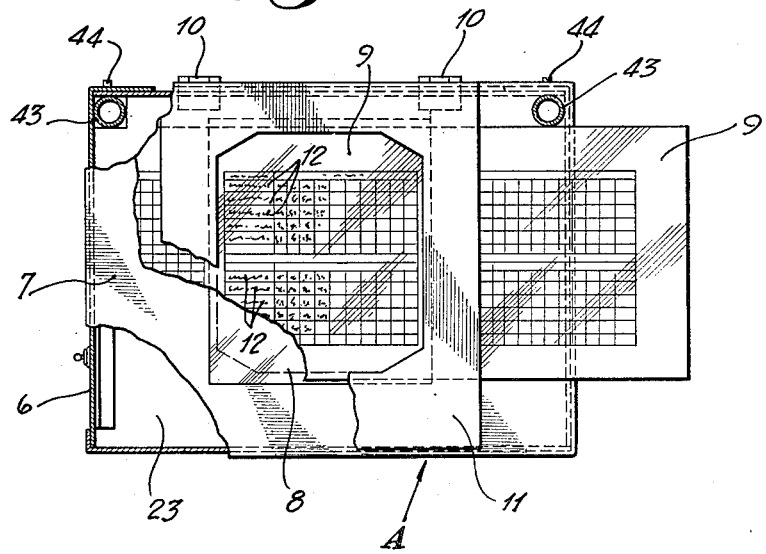
Fig. 4 is a detail, transverse, sectional view taken upon the line 4—4, Fig. 2, and looking in the direction of the appended arrows.

Referring with particularity to the drawings, we have indicated at A a scoring or record-making apparatus, adjacent to which is shown the figure of a score-keeper seated in position to face a pair of bowling alleys, B, B, whereby he may write out the bowling scores as they are produced. This apparatus A then directs the score to a score-board C, where it is displayed in position for the bowling contestants and the spectators, none of whom is shown in the drawing as present. The apparatus is shown as including an upright casing 6 which has a top frame portion 7 within which is positioned a sheet of glass or other transparent member 8 upon which is positioned the transparent score sheet 9. Hinged to the top frame member 7 as at 10 is a frame member 11, which may be lowered into position to rest upon the border portions of the score sheet 9 to hold it in flat position, whereby the score-keeper may write upon it the score as it progresses. One of these score sheets is shown in position in Fig. 4, the same having a plurality of scoring surfaces whereby the scoring of successive contests or games may be made upon a single sheet; and, as a bowling score each of these score sheets or spaces, joined together as stated, may have at the left a series of spaces, 12, arranged vertically wherein the names of the bowling contestants may be entered, each such scoring sheet 9 having an upper portion for one team of contestants, and a lower portion for another, as clearly indicated in Fig. 4. To the right of these spaces 12, for names, are vertical columns of spaces which may be subdivided as desired, wherein the figures or indicia pertaining to the scoring may be written or imprinted. As one score sheet of the plurality is filled up, it is moved to the left and fresh upper and lower recording surfaces of the next attached scoring surface brought into position for use.

Within the casing 6 is provided a source of light 13 indicated as an electric bulb, and beneath it is shown a concave mirror 14 having its reflecting surface curved with respect to the illuminating central point 15 of the globe 13, whereby the exterior surface of the bulb and the reflecting surface of the mirror have common radii of different length. The mirror and the bulb may be mounted adjustably upon an upright, 16, and held thereon in suitable positions by set screws 17 applied to the slidable brackets 18 of said bulb and mirror respectively. At one side of the casing 6, and within same, is an electric cooling fan 20, or other suitable agency of air agitation, which causes induction of air within the casing 6 through openings 6a, and exit of heated air through opposite openings 6b. This fan is serviced by electrical conductors 21 proceeding from a suitable source of electrical energy (not shown) from which also, through conductors 22, electrical energy is supplied to the bulb 13. Transverse partitions 23 and 24 are provided above the lamp 13, the latter being frame shaped and having clamped thereto, as at 25, a sheet of glass or other transparent material beneath a convex lens 27 similarly clamped, as at 28, to the frame shaped partition 23, and directly above the convex lens 27 is disposed another convex lens 28, the convexities of said lenses being opposed to each other. The lens 28 is suitably clamped, as at 29, to the top frame shaped member 7. The image written upon the score sheet 9 is directed by paths of light rays first diverged from the lamp bulb 13 and then converging upwardly toward a series of angularly related mirrors 30, 31 and 32, and a double convex lens 33 which is so disposed that the light rays conveying the image from the record or score sheet 9 are directed first to the mirror 30 in the paths indicated, with slight convergence, thence in slight convergence from the mirror 30 to the mirror 31, which is set at an angle to the mirror 30 with the tops and bottoms of said mirrors substantially parallel. From the mirror 31, in continued convergence, the light rays conveying the image proceed to the reflecting surface of the mirror 32, which mirror, as clearly shown in the drawings, is tilted at an angle to a vertical transverse plane of the apparatus, whereas the mirrors 30 and 31 are tilted at an angle to the front-to-rear vertical plane of the apparatus. The tilting of the mirror 32 is such as to direct the rays received from the mirror 31 toward the screen or display surface C, the convergence of such rays continuing until they meet and then diverge, thus inverting the image and bringing it to proper left-to-right reading, which reading had previously been received by the mirror 31 in normal top and bottom disposition, which was inverted as the rays struck the mirror 32, requiring re-inversion to cause it to read top up and bottom down on the screen C.

The mirror 32 is shown as pivotally mounted at 34 upon a bracket 35 whereby it may swing and be locked in position by locking screw 36, the mounting being upon a partition 37 in an annular casing 38 which encloses the mirrors but is cut away segmentally at the bottom at one side as at 39 to receive the light rays directed at the lens 33 and is cut away in front as at 40 for the emission of the light rays from the mirror 32. The mirrors 30 and 31 are suitably supported by frames 41 mounted upon bolts 42 extending from front to rear of the casing 38. The casing 38 and its attendant parts are mounted upon uprights 43 which in turn pass slidably through the top partition 7 and also through the partitions 23 and 24 beneath same, and may be held in position of vertical adjustment by set-screws 44.

The operation, method and use and advantages of the invention will be readily observed from the foregoing description taken in conjunction with the accompanying drawings, it being obvious that the score-keeper may progressively write the score upon the record sheets 9 as the game or contest progresses, and this will be displayed, enlarged to the extent which may be desired and predetermined, upon the screen or recording surface C, facing the contestants and the spectators for clear reading.

It is obvious that variations may be made with respect to the foregoing description and with respect to the details of the drawings in adapting the invention to varying conditions of use or service or requirement or desire, all without departing from the true spirit of the invention.

Having thus disclosed our invention, we claim and desire to secure by Letters Patent:

1. In a bowling-score projector adapted for use in a bowling alley, a cabinet located at the back of the playing area of the alley and having a translucent top panel to support a record of a bowling score, an image of which is to be projected, a source of illumination enclosed by the cabinet below the top panel, a lens retained in the cabinet above the light source and below the panel to direct a beam of light upwardly through the panel and through the record, a casing carrying an objective lens, means mounted on the top of the cabinet at the side of the latter nearest adjacent the alley for supporting the casing and objective lens in positions above the top, said means having an opening therein to enable the person located in back of the cabinet to view the opposite end of the alley through said opening, a screen, means to mount said screen in a position elevated above the alley, reflecting means arranged in the casing to direct the image of the record registered on the objective lens obliquely upward onto the screen, the screen and casing being juxtaposed with respect to the alley and cabinet to assure the direction of the image-carrying beam from the mirrors to the screen over the heads of contestants using the alley, whereby the contestants, scorekeeper and spectators seated in back of the cabinet may view the projected image of the score on the screen.

2. In a bowling-score projector adapted for use in a bowling alley, a cabinet supported at the rear of the playing area of the alley, a screen disposed forwardly of the playing area, a light source enclosed in the cabinet, a lens for directing a beam of light upwardly through the top of the cabinet and through a sheet carrying the record of a bowling score, an image of which is to be projected, an objective lens to receive an image of the score record, means to support the objective lens above the cabinet and spaced therefrom to provide an unrestricted line of vision between the cabinet and objective, to the screen, and mirrors arranged to project the image onto the screen whereby the contestants, scorekeeper and spectators located in the playing area or rearwardly thereof may view the screen and an image of the bowling score record projected thereon.

3. In a bowling-score projector adapted for use in a bowling alley, a cabinet located at the head of the alley in the playing area thereof, and having a transparent top portion, a screen, means to support said screen in a position spaced from and above the alley, a light source within the cabinet, a lens in the cabinet to direct a beam of light emanating from said source of light upwardly through said top portion, an objective lens to receive an image of subject-matter disposed on said top portion, a plurality of mirrors, means for mounting said objective and mirrors above the cabinet with the mirrors in positions to reflect an image registered on said objective onto the screen, a portion of the area intermediate the top of the cabinet and said mirrors being unrestricted to enable clear visibility by a person located at the side of the cabinet opposite to the screen, to the screen and to the area below the screen.

4. In a bowling-score projector adapted for use in a bowling alley, a cabinet disposed at the head of the bowling alley and in the playing area thereof, and having a transparent top for the support of a record, an image of which is to be projected, a source of light in the cabinet below the top, a lens to direct a beam of light through the top and through the record, an objective lens disposed above the top to register an image of the record, a plurality of mirrors, means to support one of the mirrors at a level above the top to cast an image of the subject-matter on the top of the cabinet as registered on said objective laterally, means to support a second of the mirrors to receive the reflection from said first mirror, means to support a third mirror of the plurality thereof at a level different from the level at which the second mirror is disposed and spaced from the cabinet to enable an unobstructed view under said third mirror of the farther end of the alley by a person seated at the opposite side of the cabinet, a screen, means to support the screen above the alley, said last-named mirror being arranged to receive an inverted reflection of the image of the record on the cabinet top from said second mirror and cast a reinverted image of the subject-matter carried by the top of the cabinet onto the screen.

5. In combination in an installation for bowling alleys, a substantially vertical screen, and a projector comprising a casing, the upper end of said casing being light transmitting and having a substantially flat upper surface whereby a scorekeeper may position a translucent score card thereon on which he may enter the score while it is positioned on said upper surface, a source of light in said casing, a condenser system adapted to collect light rays from said source and to illuminate the upper surface of said casing, a second casing positioned above said first casing a distance sufficient to permit a clear view of the screen under said second casing by a person seated at the opposite side of said first-named casing, an objective lens in said casing to register an image of the score card, and reflecting media to transmit said image from said objective to said screen.

6. In a bowling score projector adapted for use in a bowling alley, a cabinet located at the back of the playing area of the alley having a translucent top writing panel for supporting a sheet on which a scorekeeper, seated at the cabinet and facing the opposite end of the alley, may record the score of a bowling game, an image of which sheet is to be projected, a light source supported at one side of said panel for illuminating the panel of the cabinet, a condenser system supported between the light source and panel to concentrate a beam of light emanating from said light source on said panel, an objective lens, means to support said objective at the opposite side of said panel in the path of the beam of light directed through said panel by said condenser system after said light beam has passed through said panel, to register an image of the score record, reflecting means including a pair of mirrors to reflect the image of the score record, means for supporting one of said mirrors in the path of the beam of light passing through said objective lens, a screen, means for supporting said screen at a level above the alley and above said reflecting means in a substantially vertical position and in substantially the same vertical plane in which the cabinet and subject of the record are located, means for supporting the other mirror of said pair in a position elevated with respect to the cabinet a sufficient distance to cast the image-carrying beam of light over the heads of players standing intermediate the cabinet and the plane in which said screen is located, to said screen, said objective lens and reflecting means and the supporting means therefor being disposed with respect to the cabinet to provide an unrestricted line of vision by the scorekeeper to the subject of the record and to the screen located at the opposite side of the cabinet from the scorekeeper.

JOHN B. COKER.
HAROLD G. FITZ GERALD.